United States Patent
Mathey (10) Patent No.: US 9,772,059 B2
(45) Date of Patent: *Sep. 26, 2017

(54) METHOD OF DISPENSING A MATERIAL

(71) Applicant: LMK Technologies, LLC, Ottawa, IL (US)

(72) Inventor: Jason M. Mathey, Oglesby, IL (US)

(73) Assignee: LMK Technologies, LLC, Ottawa, IL (US)

(*) Notice: Subject to any disclaimer, the term of this patent is extended or adjusted under 35 U.S.C. 154(b) by 16 days.

This patent is subject to a terminal disclaimer.

(21) Appl. No.: 13/804,975

(22) Filed: Mar. 14, 2013

(65) Prior Publication Data

US 2014/0270968 A1    Sep. 18, 2014

(51) Int. Cl.
  *F16L 55/18*    (2006.01)
  *F16L 55/1645*  (2006.01)
  (Continued)

(52) U.S. Cl.
  CPC .......... *F16L 55/1645* (2013.01); *B05D 3/067* (2013.01); *B05D 3/12* (2013.01); *B05D 5/005* (2013.01); *B05D 7/22* (2013.01); *B29B 13/08* (2013.01); *B29C 35/0805* (2013.01); *B29C 67/246* (2013.01); *B29C 73/02* (2013.01); *F16L 55/18* (2013.01); *B29C 2035/0827* (2013.01);
  (Continued)

(58) Field of Classification Search
  CPC ................ F16L 55/164; F16L 55/1645; F16L 55/16455; F16L 55/18
  USPC .............................. 405/184.1, 184.2; 138/97
  See application file for complete search history.

(56) References Cited

U.S. PATENT DOCUMENTS 3,103,235 A    9/1963    Stringham
3,269,421 A    8/1966    Telford
(Continued)

FOREIGN PATENT DOCUMENTS

| EP | 0 306 200 | 3/1989 |
| WO | 9429632 | 12/1994 |
| WO | 2012168694 | 12/2012 |

OTHER PUBLICATIONS

LMK Technologies, LLC, PCT/US2014/018855 filed Feb. 27, 2014, "The International Search Report and the Written Opinion of the International Searching Authority, or the Declaration", dated Jun. 16, 2014.

(Continued)

*Primary Examiner* — Frederick L Lagman
(74) *Attorney, Agent, or Firm* — Nyemaster Goode, PC (57) ABSTRACT

A method and system for dispensing a material through a delivery apparatus is provided. The material initially comprises or is manipulated to comprise a low viscosity. The material either can comprise a curable material or can comprise initiators, which can be activated to raise the viscosity at a later time and position. The low viscosity material is moved through the delivery apparatus for a relatively long distance using low energy. Upon nearing an end use application, the material and/or initiators can be activated by a curing agent, such as a light or heat source, such that the viscosity of the material be raised prior to the end use application thereof. Therefore, the present invention provides a method and system for moving a material normally having a higher viscosity a long distance requiring lower energy and pressure.

20 Claims, 5 Drawing Sheets

(51) Int. Cl.

| | | |
|---|---|---|
| *B29B 13/08* | (2006.01) |
| *B29C 67/24* | (2006.01) |
| *B05D 3/06* | (2006.01) |
| *B05D 3/12* | (2006.01) |
| *B05D 5/00* | (2006.01) |
| *B05D 7/22* | (2006.01) |
| *B29C 35/08* | (2006.01) |
| *B29C 73/02* | (2006.01) |
| *B29K 105/00* | (2006.01) |
| *B29L 23/00* | (2006.01) |

(52) U.S. Cl.
CPC ... *B29K 2105/0058* (2013.01); *B29L 2023/22* (2013.01)

(56) References Cited

U.S. PATENT DOCUMENTS

| | | | |
|---|---|---|---|
| 3,618,639 A | 11/1971 | Crooker | |
| 3,834,421 A | 9/1974 | Daley | |
| 3,834,422 A | 9/1974 | Larson | |
| 3,894,131 A | 7/1975 | Speech | |
| 4,401,696 A | 8/1983 | Wood | |
| 4,497,663 A * | 2/1985 | Fisher et al. | 405/184.1 |
| 4,581,247 A | 4/1986 | Wood | |
| 5,019,417 A | 5/1991 | Northcutt | |
| 5,964,249 A | 10/1999 | Kiest | |
| 6,068,725 A | 5/2000 | Tweedie | |
| 6,170,531 B1 * | 1/2001 | Jung et al. | 138/97 |
| 6,602,025 B2 * | 8/2003 | Markusch et al. | 405/184.2 |
| 6,641,688 B1 | 11/2003 | Gearhat | |
| 6,820,653 B1 | 11/2004 | Schempf | |
| 6,966,950 B2 | 11/2005 | Winiewicz | |
| 7,905,255 B2 | 3/2011 | Iwasaki-Higbee | |
| 7,931,091 B2 | 4/2011 | Bailey et al. | |
| 2004/0156682 A1 * | 8/2004 | Blackmore et al. | 405/184.1 |
| 2006/0070676 A1 | 4/2006 | Blackmore | |
| 2006/0108450 A1 * | 5/2006 | Klinkenberg | B05B 7/228 239/525 |
| 2009/0229696 A1 * | 9/2009 | Warren | 138/98 |
| 2010/0243092 A1 | 9/2010 | Gillanders | |
| 2010/0301505 A1 | 12/2010 | Kiest | |
| 2012/0141210 A1 | 6/2012 | Kiest | |
| 2014/0048164 A1 * | 2/2014 | Souza | 138/97 |

OTHER PUBLICATIONS

LMK Technologies, LLC, PCT/US2014/018851 filed Feb. 27, 2014, "The International Search Report and the Written Opinion of the International Searching Authority, or the Declaration", dated Jun. 17, 2014.

ATSAR-X11539-EP Search Report PCT/US2014/018855 dated Sep. 23, 2016.

XP-002761364 "A UV-Initiated Reactive Extrusion Process for Production of Controlled-Rheology Polypropylene".

* cited by examiner

Fig.5C ically very thick (high viscosity), making it difficult to pump through the hoses. To compensate, heated hoses are used to lower the viscosity by raising the temperature. A problem with this is that heated hoses in a pipeline, especially in a sewer, are not a good thing. In addition, the hoses are very expensive and are big, heavy, and bulky, with connectors that can short out and corrode. Another disadvantage is that when the material does come out the end, it is a low viscosity because it has been heated. Even if the last 25-50 feet of hose is not heated, which allows the material to thicken, you now have 50 feet of hose that you are pumping a high viscosity material, which will require higher pressures. There is also the concern of viscosities not changing between A and B because you need the proper mix ratio.

METHOD OF DISPENSING A MATERIAL

FIELD OF THE INVENTION

The present invention relates generally to a method for moving and dispensing a material over a relatively long distance by utilizing a material having an initial low viscosity and raising the viscosity during transport of the material at or near a final end use for the material.

BACKGROUND OF THE INVENTION

Liquid or liquid-like materials, such as resins, medicines or other healthcare liquids, grouts, and the like are often utilized or needed at a location remote from a storage or source. Therefore, the materials are pumped or otherwise transported from the storage or source to the location of the end use application for the material. The materials can be transported relatively long distances. For example, resin used for pipe repair can be pumped hundreds of feet. Liquids used in healthcare, such as pumping a material through a patient's blood vessel or to a location in a patient, may not be as long of a distance, but due to the size of the material and delivery apparatus, the distance is comparable to pumping the resin for pipe repair over the longer distance.

To be able to pump the material the required distance, the viscosity of the liquid material must be low enough to not become clogged or otherwise prevent the movement of the material. While the low viscosity material is ideal for pumping or transporting, it can be less than ideal for the actual end use application for the material. For example, a material having a low viscosity would sag or fall off the interior wall of the pipe or structure, when used to repair pipes. For other uses, the low viscosity of the material will prevent proper end use applications as well. Blood or medicine that is transported to a particular location in a patient may not be able to be utilized, as it does not have the correct consistency or viscosity for the use.

Methods have been used to try to change the viscosity of a material in transport. One application has been used in pipe repair. The technology will take a two-part epoxy and twin hoses—one hose having part A and the other having part B. The materials are pumped through the hoses and then mixed at the end of the hose; typically, where there is a spinning nozzle that will spin the materials onto the wall of the pipe. The mixed material is typi- Therefore, there is a need in the art for a method and apparatus for pumping a curable material a long distance, while allowing the viscosity of the material to be changed prior to reaching its end use application such that the material will be in a usable form at the location of its end use.

SUMMARY OF THE INVENTION

It is therefore a primary object, feature, and/or advantage of the present invention to overcome deficiencies in the art.

It is another object, feature, and/or advantage of the present invention to provide a method for transporting a liquid or liquid-like material a distance and changing the viscosity of the material prior to an end use.

It is yet another object, feature, and/or advantage of the present invention to provide a method of at least partially changing the viscosity of a liquid or liquid-like material while transporting the material.

It is still another object, feature, and/or advantage of the present invention to provide a method for pumping a curable material a long distance.

It is yet a further object, feature, and/or advantage of the present invention to provide a method and apparatus for repairing a pipe using a one-part, UV cured resin pumped a long distance.

It is still a further object, feature, and/or advantage of the present invention to provide a method and apparatus that includes a partial curing region in a pumping and dispensing apparatus to partially cure a material during transport.

These and/or other objects, features, and advantages of the present invention will be apparent to those skilled in the art. The present invention is not to be limited to or by these objects, features and advantages. No single embodiment need provide each and every object, feature, or advantage.

According to an aspect of the invention, a method of dispensing a material through a delivery apparatus having a starting end and a dispensing end is provided. The method includes pumping a material capable of changing viscosities through the delivery apparatus, at least partially changing the viscosity of the material via a UV-light source while pumping the material, and dispensing the material comprising the at least partially changed viscosity out of the dispensing end of the delivery apparatus.

The material can comprise curable material, such as an ultraviolet (UV) curable initiator. Generally, the material will be a one-part material, such as a one-part resin. The UV initiators can be added to the material. Thus, the material can be changed to a low viscosity, with the initiators therein. The material can be pumped through the delivery apparatus. At a location relatively near or at the dispensing end or end use of the material, the material can be exposed, at least briefly, to a UV light source. The light source would raise the viscosity of the resin. The resin would then be in a more usable form for the intended end use application of the resin, e.g., repairing the wall of a pipe.

According to another aspect of the invention, a method of moving a liquid material through an apparatus to an end use application is provided. The method includes providing a material having a first viscosity and comprising a UV-curable initiator, moving the material through the apparatus and towards the end use application, and changing the viscosity of the material to a viscosity higher than the first viscosity while continuing to move the material towards the end use application.

According to yet another aspect of the invention, a system for moving a material to an end use application is provided. The system includes a delivery apparatus comprising a first end and a second end, a material capable of changing velocities capable of being pumped through the delivery apparatus and towards the end use application, the material comprising a UV-curable initiator, and a curing agent adjacent the delivery apparatus to at least partially raise the viscosity of the material by partially curing the material prior to the end use application.

DETAILED DESCRIPTION OF THE PREFERRED EMBODIMENTS

Figure 1:
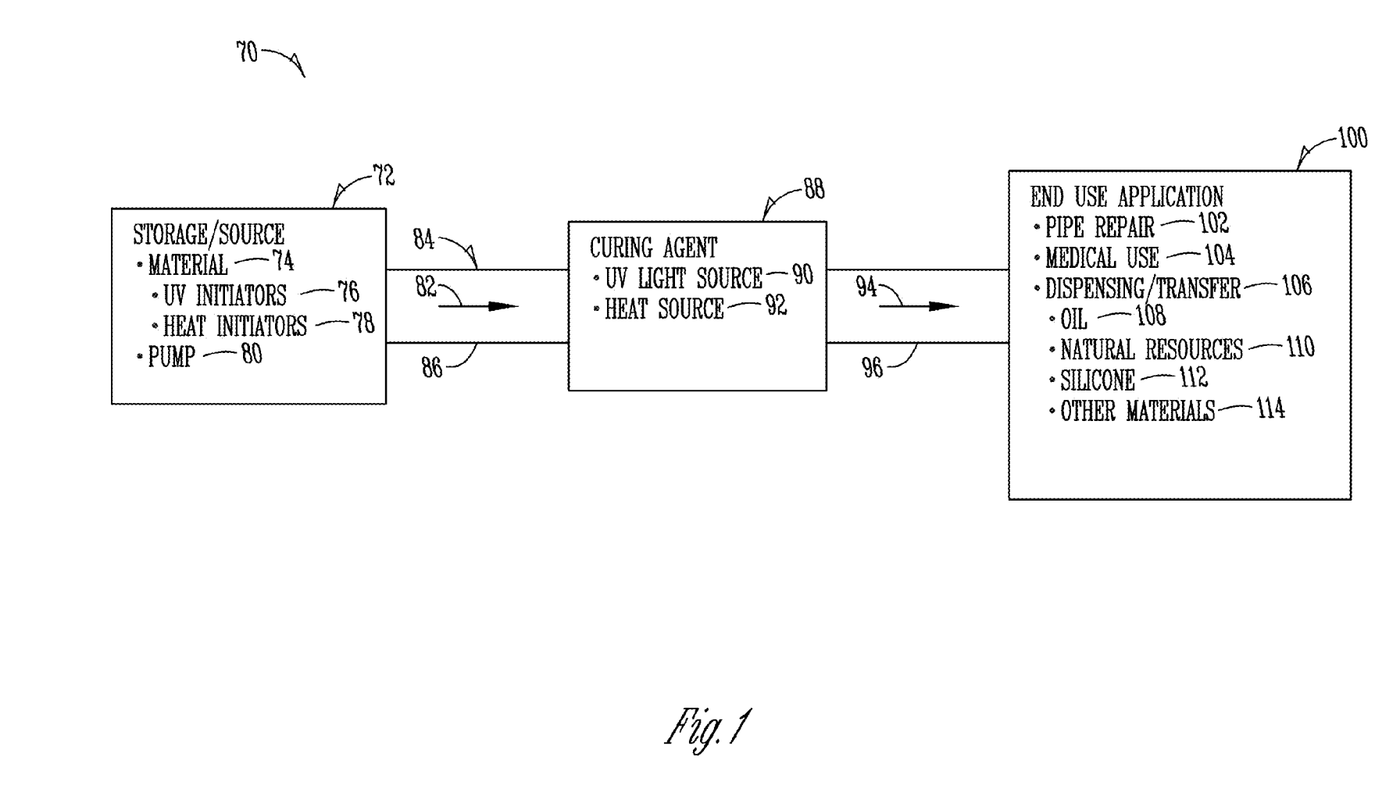
FIG. 1 is a schematic of a method a moving a liquid or liquid-like material to an end use application according to an aspect of the present invention.

FIG. 1 is a schematic view of a system 70 including a method of moving a liquid or liquid-like material 74 to an end use application 100 according to the exemplary aspect of the invention. The method and system 70 shown in FIG. 1 includes a storage or source 72 for storing and/or beginning the transfer of a material 74. Thus, the storage 72 may be any sort of storage connected to a delivery apparatus 84. For example, the storage may be a truck, a vat, a mixing chamber, or the like. A material 74 is housed within the storage 72 before being transferred via the delivery apparatus 84 to the end use application 100.

The material 74 may be liquid or liquid-like. For example, the material 74 may be an epoxy, resin, composition, solution, mixture, or the like. The material may be a single component material or may be a composition of one or more components. The material 74 at the first end 86 of the delivery apparatus 84, or within the storage 72, comprises or is manipulated to comprise a low viscosity. The low viscosity of the material 74 will allow the pump 80 connected to the delivery apparatus 84 to pump the material 74 using less energy and/or pressure. This will allow a greater efficiency of movement of the material through the delivery apparatus 84, as well as reducing the costs due to the reduction in energy required for the pump 80 to pump the material 74. It should also be appreciated that pumping a material 74 having a relatively low viscosity will reduce the amount of time of transporting the material. For example, low viscosity materials could be around 50 centipoise (cP), while high viscosity materials can be as much as or more than 50,000 cP.

The material 74 at the storage/source 72 may comprise a low viscosity, or may be mixed with a component to reduce the viscosity thereof. For example, silicone or other thick resins, grouts, or epoxies, may be mixed with a chemistry to thin out the material, thus reducing the viscosity of the material. In addition, initiators such as UV initiators 76 and/or heat initiators 78 may be included with the reduced viscosity material. Reducing the viscosity of the material will allow the material to be pumped through a delivery apparatus 84 with less pressure, energy, time, etc. The viscosity of the material will be able to be raised at a later location of the delivery apparatus 84 such that the end use application 100 may utilize the higher viscosity of the material 74. The end use application 100 may utilize the material 74 having a viscosity similar to the original viscosity before thinning, or may even be at a higher viscosity such that it can be used as desired.

The material 74 comprising a low viscosity and either comprising a UV curable material or including UV initiators 76 therein is pumped via the pump 80 in the direction generally shown as arrow 82 through the starting or first end 86 of the delivery apparatus 84. The pump may be a vacuum pump or other type of pump. As the viscosity of the material 74 will be relatively low, the pump will not be required to produce a great deal of pressure in transferring the material 74 therethrough. However, at some distance away from the first end 86 of the delivery apparatus 84, it may be beneficial to at least partially change the viscosity of the material 74 by raising the viscosity. For example, since the viscosity of the material was lowered or at a lower state at the beginning of the use, the material will be more easily pumped. However, this low viscosity material 74 may not be ideal for its intended end use application 100. As will be discussed, a possible end use of the material may be pipe repair wherein the material is dispensed about the interior of a pipe. A material having a low viscosity will not be ideal for such an application, as the material would sag or not stick to the full periphery of the interior of the pipe wall. Therefore, it may be preferred to at least partially raise the viscosity of the material prior to dispensing the material 74 at the interior of the pipe wall. This would allow the material to maintain its position about the interior periphery of the pipe wall.

Therefore, at some distance from the first end 86 of the delivery apparatus 84, a curing agent or station 88 may be provided. As will be appreciated, the curing agent 88 as provided for the present invention comprises a non-chemical, externally based device or system for at least partially raising the viscosity of the material 74. The schematic of FIG. 1 shows that the curing agent 88 may be a UV light source 90 and/or a heat source 92. For example, when the material 74 either comprises a UV curable material or comprises UV initiators 76 within the material 74, the UV light source 90 may be utilized via a low voltage amount and/or wave lengths in order to change the viscosity so that when the material is passed further through the delivery apparatus 84, the viscosity will be increased to be more paste-like. The UV light source 90 may be a light tunnel or other apparatus for exposing the UV light to the material. However, when the material 74 comprises a heat curable material and/or heat initiators 78, the heat source, such as a heat lamp, steam, or the like, may be at least partially exposed to the material 74 within the delivery apparatus to at least partially raise the viscosity of the material therein. It should also be appreciated that both the light source and the heat source may be utilized either at the same time or in conjunction with one another such that the material is exposed to both of the curing agents to at least partially raise the viscosity thereof.

After passing the curing agent or station 88, the material is continued in the direction shown by the arrow 94 towards the distal or second end 96 of the delivery apparatus 84. The material is continued towards the end use application 100 thereof. It should be appreciated that the end use application 100 for the material 74 is generally a relatively long distance away from the first end 86 of the delivery apparatus 84. Thus, the low viscosity of the material at the first end will allow the material to be dispensed to the curing station 88 and thus end use application 100 using relatively low pressure and/or energy. It should also be appreciated that the curing agent or station 88 and the end use application 100 be either at the same location or relatively close to one another such that once the material 74 has had its viscosity raised, the higher viscosity material 74 will not need to be pumped a great distance. This will further aid in reducing the energy and/or pressure of the pump required to transport the material through the delivery apparatus 84.

The present invention contemplates various end use applications 100 for delivering the material 74 and changing the viscosity of the material 74 from a generally low viscosity to a generally higher viscosity prior to the end use application 100. For example, as will be discussed in relation to FIGS. 2-4 below, one end use application may involve pipe repair 102 wherein the material is pumped a long distance through a hose, the viscosity of the material is raised via the curing agent, and the higher viscosity material is then dispensed about the interior of a pipe wall. The single component material comprising either a UV curable material or UV initiator requires only one hose for the pipe repair so that multiple components do not need to be mixed prior to dispensing the material. The viscosity could be raised at the end of the hose with a low amount of UV light and the material could then be spun or dispensed about the wall of the pipe. The material having the higher viscosity and thus being thicker reduces the possibility of sag, while also increases the final cure time of the material as the additional curing of the material can be done in a lower amount of time.

Other possible end use application may include medical use 104 and dispensing or transfer of materials 106. For example, as mentioned above, the method and apparatus of the system 70 of the present invention could be used to dispense or transfer a material a relatively large or long distance. The material 74 could start with a high viscosity and could be thinned by adding a component to it that makes it thin out, i.e. reduces the viscosity. A UV initiator 76 could also be added to the material 74 at the thinned or low viscosity stage. At the discharge end of the delivery apparatus 84, the low viscosity material 74 containing or comprising the UV initiator 76 could be exposed to a UV light to turn the low viscosity material back into the original thick material as it was before being thinned. The exposure to light could also raise the viscosity to an even higher viscosity than the original material 74. The amount of change of viscosity could be varied by the intensity of light, the amount of time exposed to light, the voltage amount, the wavelength of the light, etc. Therefore, materials such as oil 108, other natural resources 110, silicone or other plastics 112, or other materials 114 could be transferred a relatively long distance through a delivery apparatus 84 by the present invention. The materials could simply be thinned out to lower the viscosity prior to dispensing the material. An initiator, such as a UV initiator 76 and/or heat initiator 78 could be added to the low viscosity material 74. The material is then pumped through the delivery apparatus to the end use application. For instance, the oil could be dispensed to its end use application such as a refinery. At or just prior to this end use application, the material can be exposed to a curing agent, such as a UV light source 90 and/or heat source 92 such that the material will be brought back to approximately its original viscosity level. However, it should be appreciated that the viscosity level could be varied such that the end use application has the viscosity of the material at a lower level of viscosity or a higher level of viscosity than the material originally comprised.

It should be appreciated that the system and method according to the present invention has numerous uses and benefits. For example, as mentioned, the medical industry could include UV light initiators in blood or medicine prior to being dispensed within a patient's body. At or close to an end use application, such as an infection site or surgery site, the blood and/or medicine could be exposed to a UV light source to raise viscosity of the material prior to reaching the end use application. Other industrial plants that have a product or products that need to be pumped and transported could also benefit from the method and system of the present invention. Therefore, it should be appreciated that the examples described herein are for illustrative purposes only, and are not to be an exhaustive list of possible uses for the present invention. The present invention contemplates that generally any material could be transported using the system and method of the present invention.

Figure 2:
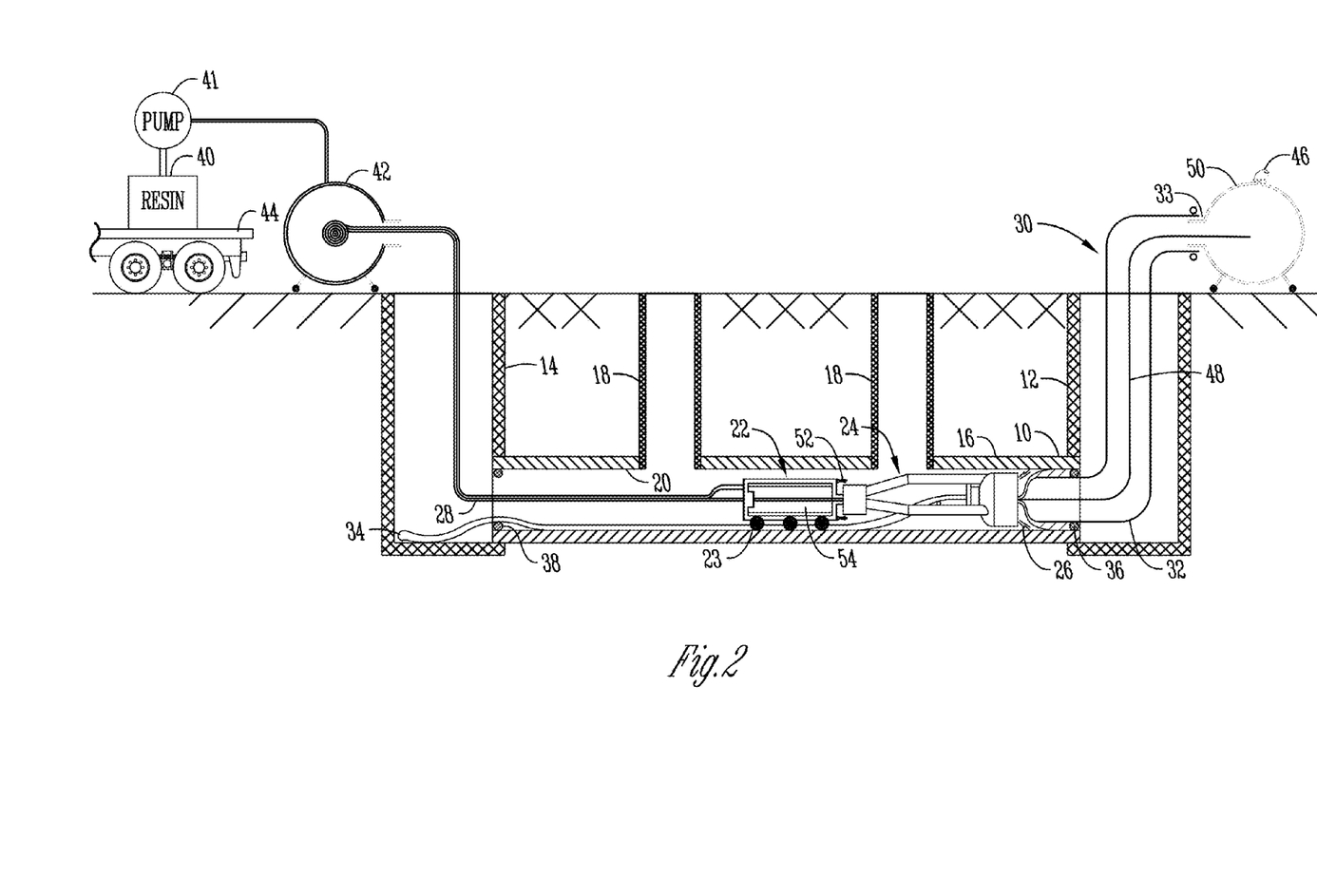
FIG. 2 is a sectional view of a pipe being repaired according to an exemplary end use application of the method of moving the material.
Figure 3:
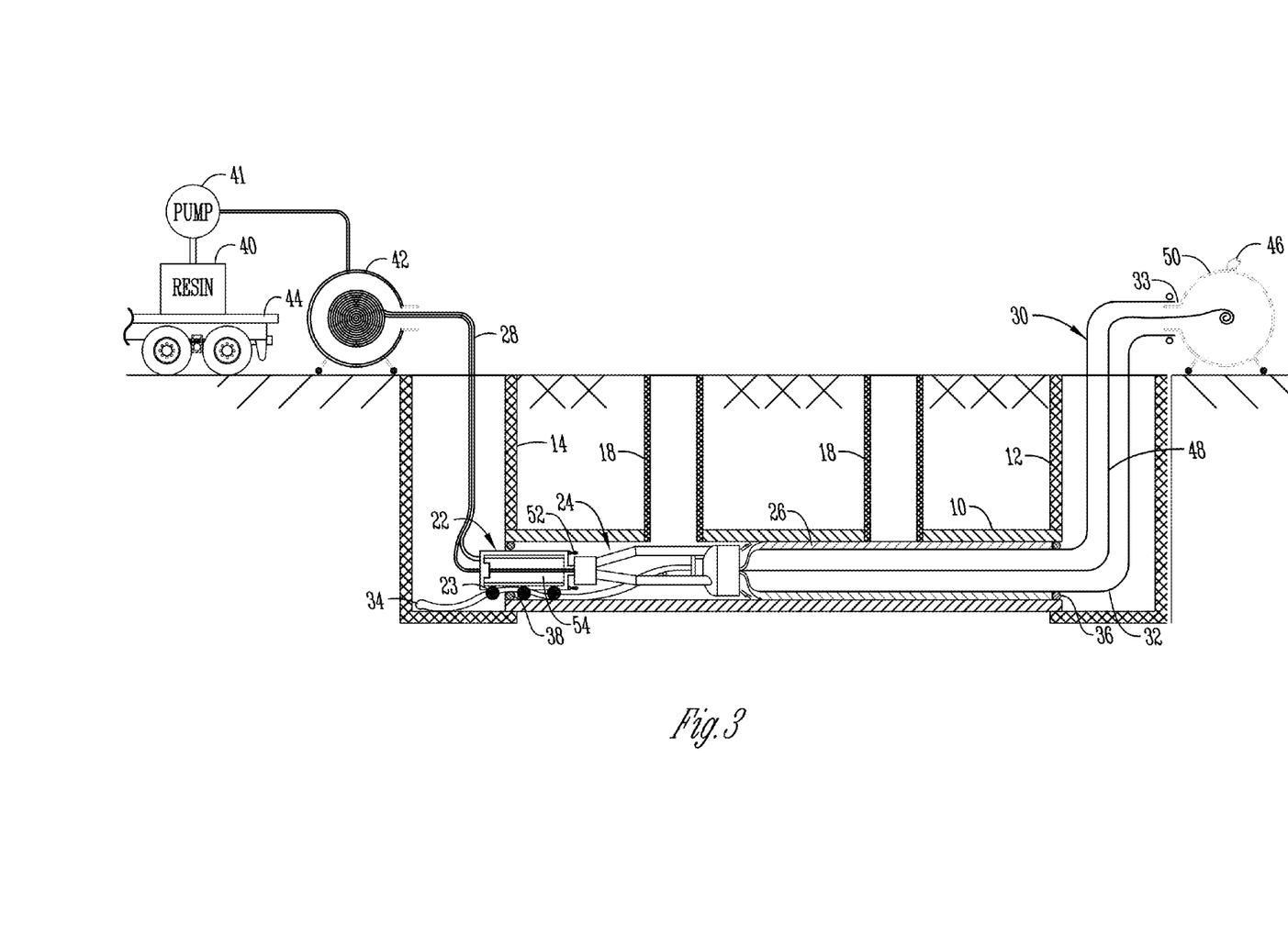
FIG. 3 is a view similar to FIG. 2, showing the repair progressing through the pipe.
Figure 4:
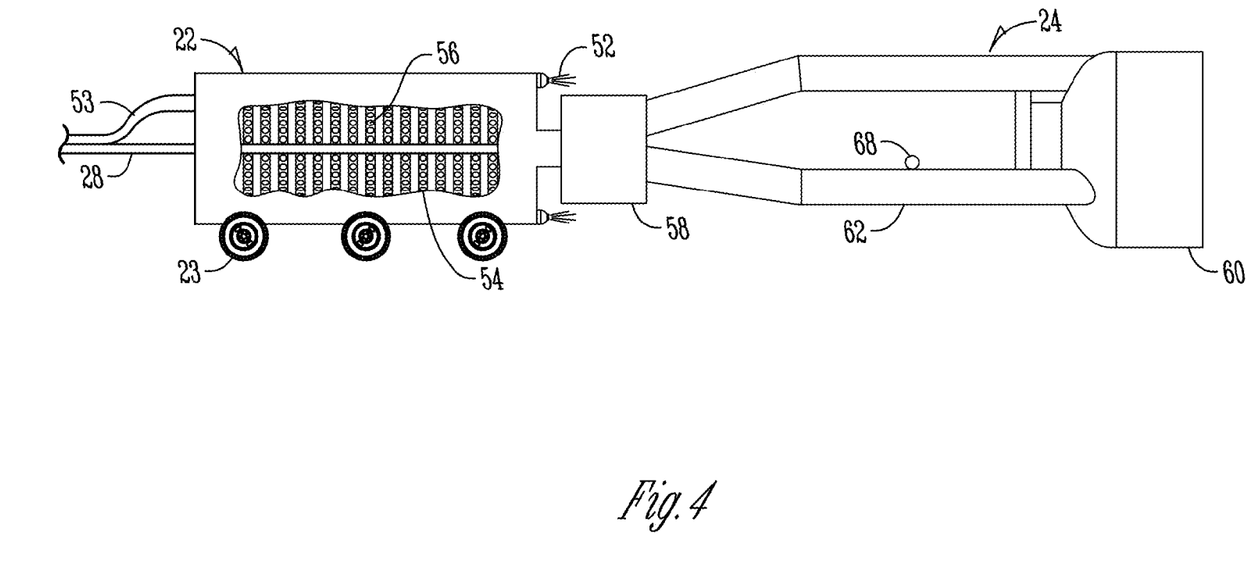
FIG. 4 is an elevation and partial sectional view of a tractor and extruder used in the pipe repair of FIG. 2 to change the viscosity of and to dispense a material.

FIGS. 2-4 show an exemplary example of the use of the method and apparatus according to the present invention. It should be appreciated that the description of FIGS. 2-4 is for illustrative purposes, and is not to be limiting to the present invention. Furthermore, additional uses are contemplated.

Referring to FIG. 2, a main pipe 10 is shown extending between an upstream manhole 12 and a downstream manhole 14. Lateral pipes 18 extend from the main pipe. The main pipe 10 shown in FIGS. 2 and 3 includes a damaged section 16 in need of repair. While the present invention is shown for use with sewer pipe repair, the present invention can be utilized for repairing other types of pipe, this including but not limiting to gas, water, oil, steam, and compressed air pipes.

To repair the damaged section 16 of the main pipe 10, a tractor 22, an extruder 24, and a bladder 30 are inserted within the pipe 10. The tractor 22 includes a plurality of wheels 23 for movement of the tractor 22 about the interior 20 of the main pipe 10. The extruder or dispensing apparatus 24 is attached to an end of the tractor 22. The bladder 30, as shown in FIGS. 2 and 3, may be positioned through or adjacent a portion of the extruder 24 and tractor 22 such that a sufficient length of bladder 30 is positioned within the pipe 10 to allow the bladder 30 to expand, such as by inflation, to allow the bladder 30 to be expanded about the full periphery of the damaged section 16 of the main pipe 10.

The tractor 22 and extruder 24 are connected to one another, and also to a resin hose 28. The resin hose 28 is connected to a resin reel 42, and is used to transport a resinous material 26 that is pumped via pump 41 from a resin source 40. The pump 41 and resin source 40 may be located on a truck 44 positioned outside of the pipe system. The pump 41 is used to pump resin 26 from the source 40 through the resin line 28 into, through, and out of the extruder 24.

As discussed above, the bladder 30 is positioned in the pipe 10, including adjacent to or through the tractor 22 and extruder 24. Shown in FIG. 2, the bladder 30 may be positioned through the extruder 24 but not the tractor 22, or may be positioned adjacent both or through both. Positioned generally at each end of the main pipe 10 are first and second gaskets 36, 38. The gaskets 36, 38 may comprise a NSF/ANSI 61 material, which may be a hydrophilic material. The first and second gaskets 36, 38 will aid in sealing the ends of the main pipe 10 such that any dispensed material will not go outside the area in need of repair. Therefore, the gaskets 36, 38 may not be at the ends of the main pipe 10, and may instead surround the damaged section 16 of the pipe. The bladder 30 includes an open end 33 attached to a bladder roller 50 including an inflation source 46, and an opposite closed end 34 positioned at the opposite end of the pipe in need of repair. A rope 48 may be extended through the bladder 30 and connected to the closed end 34 to aid in removal of the bladder 30 from the pipe in certain embodiments.

The resinous material 26 being pumped through the resin line 28, tractor 22, and out the extruder or dispensing apparatus 24 may be a one part, ultraviolet (UV) cured resin. The resin material 26 may have a low viscosity while being stored in the reservoir 40 and also while being pumped through the resin line 28. However, the viscosity of the resin material 26 may be increased to a higher viscosity prior to being dispensed at the extruder 24. Therefore, the tractor 22 may include a light tunnel 34 therein. The light tunnel 54, as will be discussed below, will include light initiators 56 for at least partially activating and curing the UV-cured resin 26 as it is pumped through the tractor 22. The light tunnel 54 of the tractor 22 will increase the viscosity of the resin material 26 prior to being dispensed via the extruder 24. As in known in the art, it is advantageous to have a higher viscosity material being pumped in a manner similar to that shown in FIG. 2 via the extruder 24 in between an exterior surface 32 of the bladder 30 and the interior 20 of the pipe 10 such that the resin material 26 will not be able to drip or migrate from the periphery of the interior 20 of the pipe 10. The higher viscosity will allow the dispensed resin to maintain its position at the interior 20 at the pipe 10.

Therefore, as shown in FIGS. 2 and 3, the resin material 26 having a low viscosity will be pumped through the resin line 28 from the reservoir 40 towards the tractor 22. The light tunnel 54 of the tractor 22 will begin to at least partially cure the material 26, thus increasing viscosity of the material as it is moved through the tractor 22. The material continues through the extruder 24, beginning in the extruder entrance 58 and exiting at the extruder exit 60, and is dispensed between an exterior surface 32 of the bladder 30 and the interior 20 of the pipe 10. As the bladder 30 is being inflated through the pipe 10 as the tractor 22 and extruder 24 are moved through the pipe, the bladder 30 will press the dispensed material against a wall of the pipe 10, where it is allowed to further cure and harden.

Other components shown in FIGS. 2 and 3 that may be included with embodiments of the present invention include one or more cameras 52 positioned on or at the tractor 22. The cameras 52, which are connected to an area external of the pipes via a camera line 53, will aid in viewing the interior of the pipe 10, including the dispensement of the resin material 26 between the bladder 30 and the pipe 10. This will aid in moving the tractor 22 through the pipe 10. The tractor 22 may be moved in the pipe 10 by pulling or rolling the resin line 28 via the resin hose reel 42. Thus, the speed of the resin hose reel 42 may be adjusted as needed according to what is shown by the cameras 52 and the pipe 10. However, it should be appreciated that not all embodiments require a camera or cameras within the pipe, and the speed of travel by the tractor 22 in the pipe 10 may be preset such that it is automatic through the pipe based on prior knowledge of the dispensing rate of the resin material 26 by the extruder 24. In addition, other sensors besides cameras may be used.

As discussed, the bladder 30 may be connected to a bladder roller 50 at an open end 33 of the bladder 30. The bladder roller 50 may include an inflation source 46, such as an air source, for inflating the bladder as the repair assembly (tractor, extruder, etc.) moves through the pipe 10. The inflation source 46 will provide air or another fluid to the interior of the bladder 30 such that the inflating edge of the bladder will remain close to the dispensing head or extruder exit 60 such that the bladder 30 will press the resin material 26 between the exterior 32 of the bladder 30 and the interior 20 of the pipe 10 as it is being dispensed. The present invention contemplates that the resin material 26 may be dispensed either in front of or behind the inflating edge of the bladder 30. It is also contemplated that, instead of the tractor 22 moving due to the resin hose reel 42, the inflation of the bladder 30 may also press against the extruder exit 60 end of the extruder 24 such that the continued inflation of the bladder 30 will move the tractor 22 and extruder 24 through the pipe 10. The extruder 24 may also include a plate (not shown) or other device for resting adjacent the inflating portion of the bladder 30. In addition, a rope 48 may be connected to the reel 50 and closed end 34 of the bladder 30 such that the rope may be pulled or reeled once the resinous material has cured to remove the bladder 30 from the interior of the pipe 10. However, it is also contemplated in other embodiments that the bladder may remain within the pipe 10.

While FIGS. 2 and 3 show the bladder 30 and resin material 26 blocking the lateral pipes 18 extending from the main pipe 10, it should be appreciated that the present invention contemplates that the lateral pipes 18 may be reinstated once the resin material 26 has cured, thus reinstating access to the main pipe 10 via the lateral pipes 18. The lateral pipes 18 may be reinstated as is known the art, such as by cutting the resin material and/or bladder material at the opening of the lateral pipes 18.

FIG. 4 is a side elevation and partial sectional view of a tractor 22 and extruder 24 that may be used for the pipe repair according to embodiments of the present invention. As discussed, a resin line 28 is configured to pump the resin material 26 from the reservoir 40 to the extruder 24. As shown in FIG. 4, the resin line 28 may pass through the tractor 22 and into the extruder entrance 58 of the extruder 24. As shown by the sectional view of the tractor 22, the interior of the tractor 22 includes a light tunnel 54 comprising a plurality of light initiators 56. As discussed above, the resin material 26 may be one part, UV-cured resin having an initial low viscosity. The low viscosity of the resin will allow the resin to be pumped easily over long distances. However, it may be desired to dispense a resin having a higher viscosity within the pipe 10. The light tunnel 54 comprising the plurality of light initiators 56 comprise UV light sources such that the resin material 26 passing through the transparent resin line 28 through the tractor 22 will be initiated by the light initiators 56 to begin curing. This curing will raise the viscosity of the resin as it moves through the tractor 22 and into the extruder 24. Thus, the resin being dispensed by the extruder 24 will have a higher viscosity that will maintain its position at the interior 20 of the pipe 10. Thus, there will be less chance of the resin material 26 running from the crown of pipe or the pipe and/or sagging.

Figure 5A:
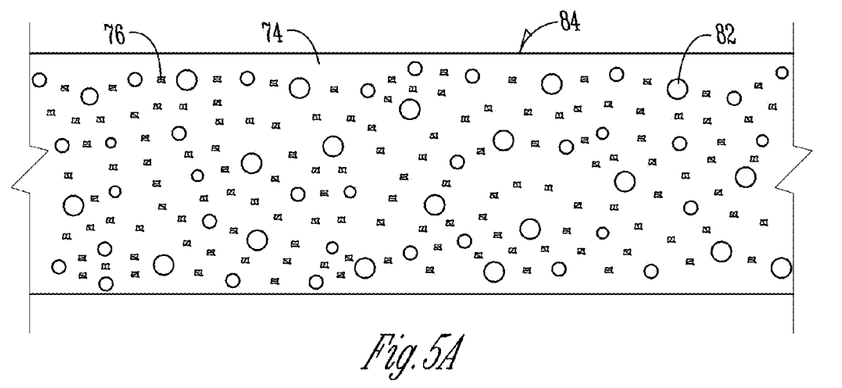
FIG. 5A is a partial view of a section of a dispensing apparatus containing a material with UV-curable initiators and having a first, low viscosity.
Figure 5B:
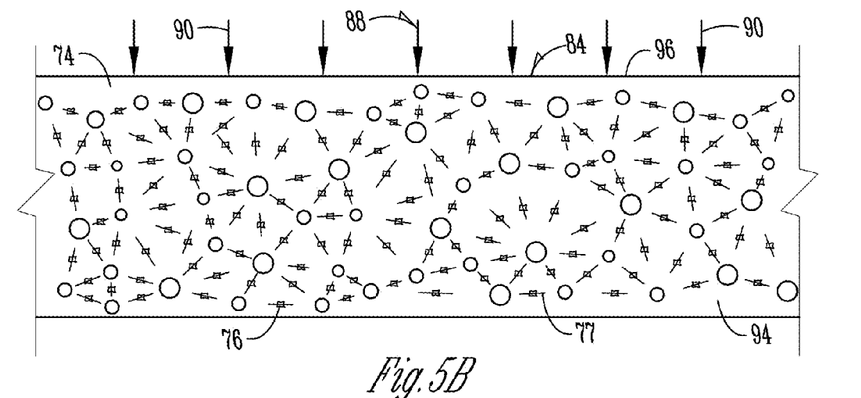
FIG. 5B is a view similar to FIG. 5A after the viscosity of the material has been raised at least partially.
Figure 5C:
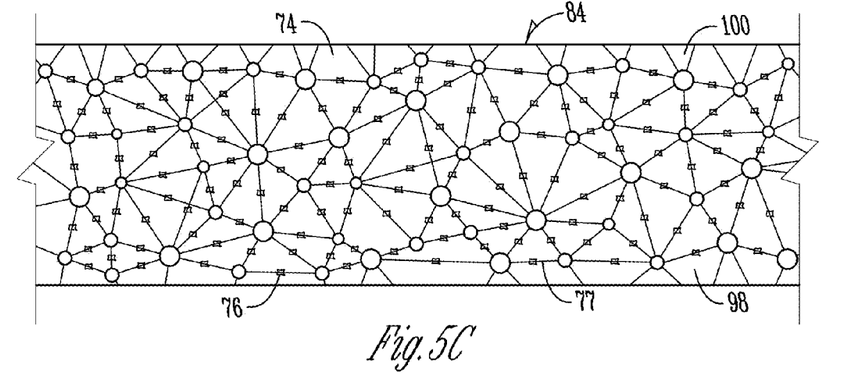
FIG. 5C is a view similar to FIGS. 5A and 5B wherein the material has been fully cured.

FIGS. 5A-5C are partial sectional views of a dispensing apparatus 84 containing a material comprising a UV curable material and/or UV curable initiators. FIG. 5A shows a section of the dispensing apparatus 84 containing a material 74 comprising a low viscosity and comprising light initiators 76 therein. The material, such as a resin, epoxy, grout, or the like, can include multiple components, including the light initiators 76. However, the material 74 shown in FIG. 5 will be of such a viscosity that low energy and/or pressure is required to move the material through the dispensing apparatus 84.

FIG. 5B shows a section of the dispensing apparatus 84 adjacent the curing agent or station 88, in this case a UV light source 90 having light rays, which are shown by the arrows in FIG. 5B. As mentioned, the curing agent 88 can change the viscosity of the material 74 in the dispensing apparatus 84, such as by partially curing the material to raise the viscosity thereof. As shown in FIG. 5B, the light initiators 76 will be activated by the rays of the UV light source 90 such that partial bonds 77 will begin to be formed within and between the components of the material 74. Thus, the material 74 shown in FIG. 5B will have a higher viscosity 94, which would occur at a distal or second end 96 of the dispensing apparatus 84. However, it should be appreciated that the material 74 shown in FIG. 5B will still be able to be transported through the dispensing apparatus, but it may require a higher pressure to do so.

FIG. 5C is a schematic of the material 74 in the dispensing apparatus 84 at an end use application 100 thereof. The material 74 shown in Figure C is shown as being fully cured 98. Thus, the material has been cured via heat, light, or some combination thereof to fully cure and harden the material therein. This is shown by the inclusion of bonds 77 connecting all of the components of the material 74 in FIG. 5C. In this case, therefore, the end use application 100 may be a pipe repair or other end use wherein it was desired for the material to become fully cured at the end use application, which may be near or approximately at the distal end 96 of the dispensing apparatus 84. However, it should be appreciated that not all uses of the system will result in the material becoming fully cured and/or hardened at the end use application. Instead, the raising of the viscosity of the material 74 via the curing agent 88 may simply revert the material from a low viscosity back to its original higher viscosity for its end use application. The present invention is not to be limited to the depiction shown in FIGS. 5A-5C.

Thus, as has been shown, the present invention is a method and system for transporting a liquid or liquid-like material through a hose, conduit or other dispensing apparatus by pumping, vacuuming, or the like. The material starts out being low, to require the least amount of energy to move the material through the dispensing apparatus. For example, the more consistency the material is like water, the easier it is to move said material. However, material can comprise a heat or light curable material, or can comprise heat or light initiators therein. The curable material and/or initiators provide for the raising of the viscosity of the material at some later location after transport of the material through the delivery apparatus. Thus, once the material has been transported using the least amount of energy, prior to an end use application thereof, the material can be activated to raise the viscosity thereof to allow for the end use application of the material.

The invention has been shown and described above with reference to embodiments, and it is understood that modifications, substitutions, and additions may be made which are within the intended spirit and scope of the invention. For example, the invention has shown and describes specific examples for the use of the present invention. However, as has been mentioned, the examples and descriptions listed herein are for exemplary and illustrative purposes only, and are not to be limiting to the scope of the invention. The invention is only to be limited by claims appended hereto.

What is claimed is:

1. A method of dispensing a material through a delivery apparatus having a starting end and a distal end, comprising:
    pumping a material capable of changing viscosities through the delivery apparatus;
    at least partially changing the viscosity of the material via a UV-light source while pumping the material; and
    dispensing the material comprising the at least partially changed viscosity at the distal end of the delivery apparatus;
    wherein the material capable of changing viscosities flows unimpeded through the UV-light source.

2. The method of claim 1 wherein the material comprises a UV-curable material.

3. The method of claim 2 wherein the UV-light source comprises a light tunnel including a plurality of light initiators.

4. The method of claim 1 wherein the viscosity of the material is changed at the distal end of the delivery apparatus.

5. The method of claim 1 wherein the step of at least partially changing the viscosity of the material comprises raising the viscosity.

6. The method of claim 1 further comprising curing the dispensed material.

7. The method of claim 6 further comprising removing the delivery apparatus after dispensing the material.

8. The method of claim 1 wherein the step of at least partially changing the viscosity of the material comprises at least partially curing the material while pumping.

9. A method of moving a liquid material through an apparatus to an end use application, comprising:
    providing a material having a first viscosity;
    moving the material through the apparatus and towards the end use application; and
    changing the viscosity of the material to a viscosity higher than the first viscosity via a curing agent while continuing to move the material towards the end use application;
    wherein the changing of viscosity occurs as the material having a first viscosity passes through the curing agent in an unimpeded manner; and
    dispensing the material comprising the higher viscosity at a distal end of the apparatus.

10. The method of claim 9 further comprising dispensing the material at the end use application.

11. The method of claim 9 wherein the end use application comprises a closed end of the apparatus.

12. The method of claim 9 wherein the curing agent is external of the apparatus to at least partially cure the material to change the viscosity.

13. The method of claim 9 wherein the curing agent is UV-light.

14. The method of claim 9 wherein the material further comprises a heat-curable initiator.

15. The method of claim 9 wherein the curing agent is heat.

16. The method of claim 9 wherein the end use application is pipe repair.

17. A system for moving a material to an end use application, comprising:
    a delivery apparatus comprising a first end and a second end;
    a material capable of changing viscosities capable of being pumped through the delivery apparatus and towards the end use application; and
    a curing agent adjacent the delivery apparatus to at least partially raise the viscosity of the material prior to dispensing of the material from the second end of the delivery apparatus;
    wherein the material capable of changing viscosities flows unimpeded as the material flows past the curing agent.

18. The system of claim 17 wherein the curing agent is a UV-light that raises the viscosity of the material by at least partially curing the material.

19. The system of claim 17 wherein the end use application is a pipe in need of repair.

20. A system for moving a material to an end use application, comprising:
- a delivery apparatus comprising a first end and a second end;
- a material capable of changing viscosities capable of being pumped through the delivery apparatus and towards the end use application;
- a curing agent adjacent the delivery apparatus to at least partially raise the viscosity of the material;
- wherein the curing agent is a UV-light that raises the viscosity of the material by at least partially curing the material;
- wherein the material capable of changing viscosities flows unimpeded as the material passes the UV-light; and
- the delivery apparatus is a hose, and the UV-light comprises a tunnel at least partially surrounding the hose.

\* \* \* \* \*